Oct. 2, 1956  H. HEEP  2,764,945
PUMP AND LIQUID SHAFT SEAL THEREFOR
Filed Aug. 2, 1949  7 Sheets-Sheet 1

FIG.I.

INVENTOR.
Heinrich Heep
BY
ATTORNEY

Oct. 2, 1956 H. HEEP 2,764,945
PUMP AND LIQUID SHAFT SEAL THEREFOR
Filed Aug. 2, 1949 7 Sheets-Sheet 2

INVENTOR.
Heinrich Heep
BY
*A. H. Helvestine*
ATTORNEY

Oct. 2, 1956

H. HEEP 2,764,945

PUMP AND LIQUID SHAFT SEAL THEREFOR

Filed Aug. 2, 1949

*INVENTOR.*
Heinrich Heep
BY
*[signature]*
ATTORNEY

INVENTOR.
Heinrich Heep
BY
ATTORNEY

Oct. 2, 1956 H. HEEP 2,764,945
PUMP AND LIQUID SHAFT SEAL THEREFOR
Filed Aug. 2, 1949 7 Sheets-Sheet 5

INVENTOR.
Heinrich Heep
BY
ATTORNEY

Oct. 2, 1956    H. HEEP    2,764,945
PUMP AND LIQUID SHAFT SEAL THEREFOR
Filed Aug. 2, 1949    7 Sheets-Sheet 6

INVENTOR.
Heinrich Heep
BY
*J. H. Helvestine*
ATTORNEY

United States Patent Office 2,764,945
Patented Oct. 2, 1956

2,764,945

PUMP AND LIQUID SHAFT SEAL THEREFOR

Heinrich Heep, Annapolis, Md., assignor to the United States of America as represented by the Secretary of the Navy Application August 2, 1949, Serial No. 108,178

7 Claims. (Cl. 103—111)

(Granted under Title 35, U. S. Code (1952), sec. 266)

This invention relates to liquid seals for shafts and more particularly to liquid seals in pumps usable with inflammable or explosive liquids.

For many pump uses, particularly those chemical in nature, it is important that the usual type of friction stuffing boxes or seals be avoided as causing fires or explosions. These effects are due to heat generated by the friction or to the fact that packing material or the material of the seal is incompatible with the pump chemical, thus causing undesirable chemical reactions. These results are often very difficult to avoid, particularly when high speed elements are employed in the pump-mechanisms, as is desirable for efficiency, pumping head, and reduction of weight.

Generally stated this invention may be described as a sealing mechanism for a pump shaft which uses the leaking liquid to develop a liquid pressure opposed to the leakage pressure developed by the main pump mechanism so that these pressures are neutralized, thus eliminating leakage.

Among the other objects are to provide a simple pump seal which eliminates packing and thus mechanical friction; and to provide a liquid seal which is self-cooling in operation. Other objects are to provide a pump sealing means which is flexible in operation, as by multi-staging, and especially useful for high speed movement of pump mechanism; and to provide a sealing pump mechanism which develops centrifugal and centripetal pressures in series in a single unit.

Other objects are to eliminate leakage breakdown at high discharge pressures; to permit positive self-priming; and, in general, to improve the mechanism in various details as may be apparent from consideration of the following description and accompanying drawing in which—

Fig. 9 is a sectional elevational view of the impeller units of a modified seal construction;

Figure 2:
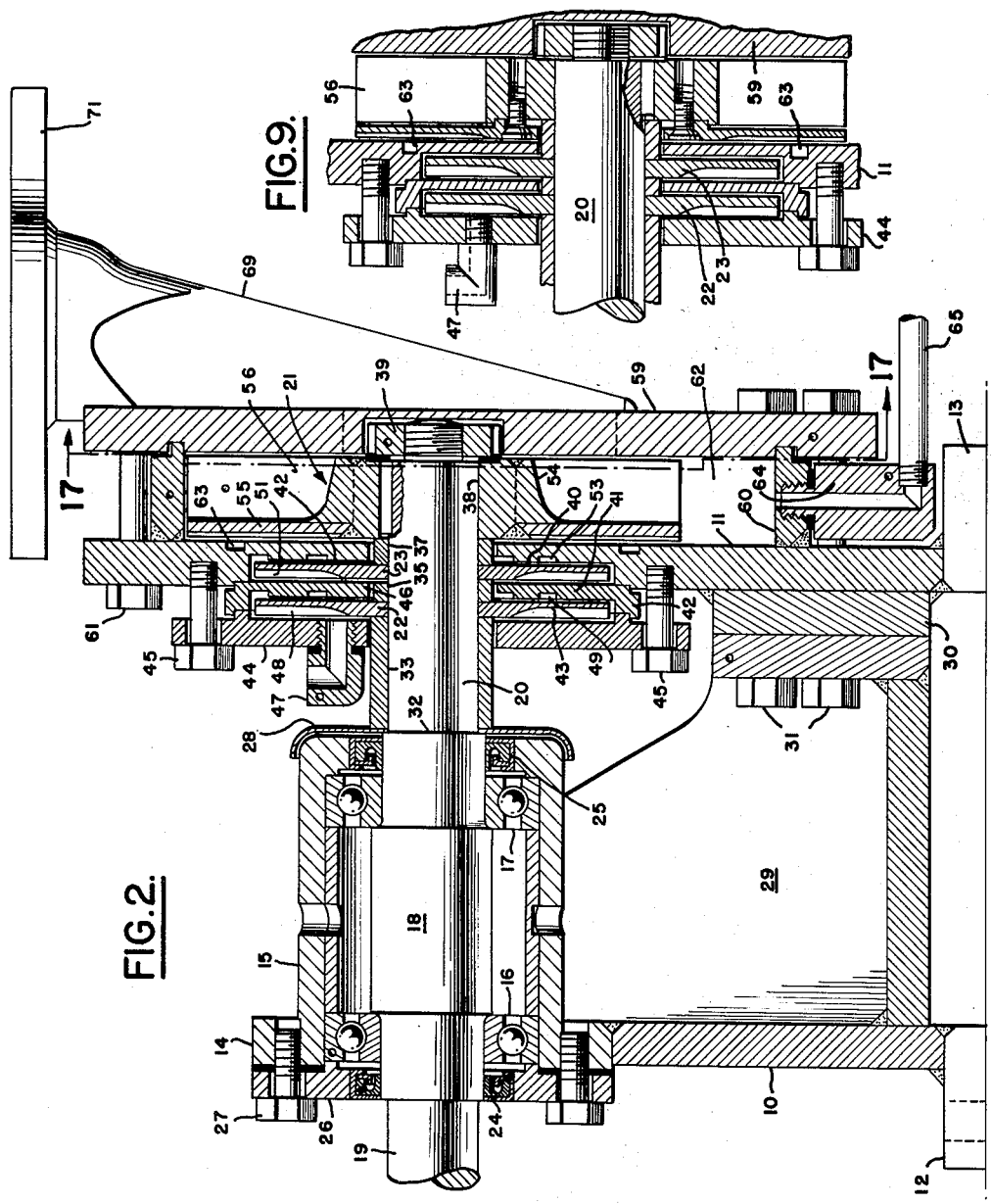
Fig. 2 is a sectional elevation of the pump unit taken along lines 2—2 of Fig. 1.
Figure 3:
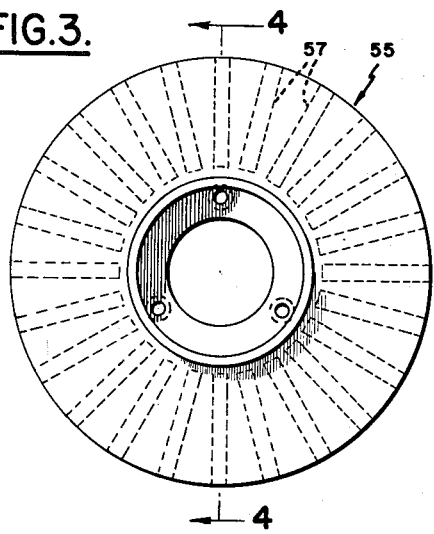
Fig. 3 is a view of the vane side of the main pump impeller back plate showing in dotted lines the reverse side radial grooves.
Figure 4:
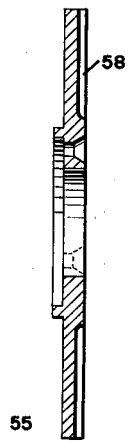
Fig. 4 is a sectional view of the impeller plate of Fig. 3, along lines 4—4 thereof.
Figure 5:
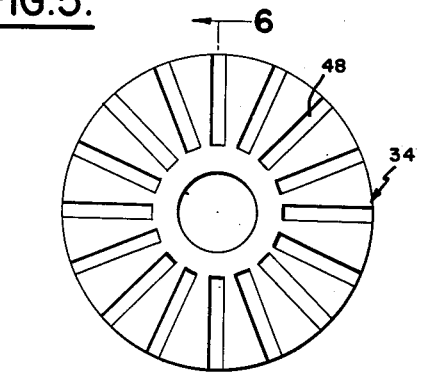
Fig. 5 is a view of the grooved side of the seal impeller.
Figure 6:
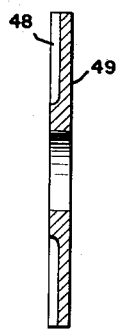
Fig. 6 is a sectional view of the seal impeller of Fig. 5 along lines 6—6 thereof.
Figure 7:
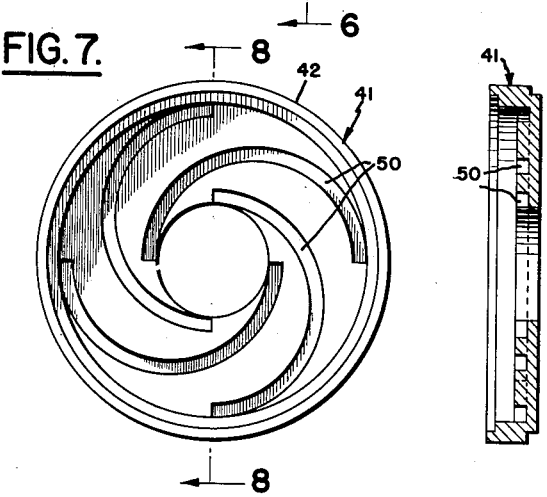
Fig. 7 is a plan view of the separating diaphragm between the seal impeller rotors.
Figure 8:
Fig. 8 is a sectional view of the diaphragm along lines 8—8 of Fig. 7.

Referring to Fig. 2, the pump unit which will be described as applied to movement of hydrogen peroxide ($H_2O_2$), is illustrated as mounted on transverse end plates 10 and 11, and welded to base blocks 12 and 13 respectively. Plate 10 is curved at the top edge to receive the end flange 14 of bearing casing 15 to which flange the plate is welded. Inside the bearing casing at respective ends thereof are ball bearings 16 and 17 in which the pump shaft 18 is rotatably mounted. This shaft extends from the support casing 15 at both ends, end 19 having connections to a motive source, and end 20 having connection, as by suitable shaft keys, to the pump impeller 21 and the seal impellers 22 and 23.

The ball bearings are protected by oil seals 24 and 25, the seal 24 being supported by an end ring 26 secured, as by bolts 27, to the bearing flange 14. Bearing 25 is protected from leakage of chemicals and the pump chemicals from bearing-oil leakage by a flinger disk 28, which is fixed to the shaft for rotation therewith. Added support for the bearing casing is provided by a spacing web 29 which extends lengthwise from the transverse plate 10 to the plate 11 beneath the bearing casing 15, to which it is attached as by welding. The pump end of the web is turned crosswise and bolted to the plate 11 through the liner 30 by bolts 31.

The shaft end 20 is reduced in diameter at the junction point with the bearing casing 15 to form a shoulder 32. On this reduced section is mounted in order the disk 28, a spacer tube 33, the outer seal pump impeller 22, the spacer ring 35, the inner seal pump impeller 23, spacer ring 37, and the main pump impeller 38. The impeller 38 is keyed to the shaft to insure rotary movement therewith. Further, to insure unitary action with the shaft of the three impellers, a terminal nut 39 is provided on the threaded shaft end which presses the various elements against the shaft shoulder 32, and thus holds them frictionally in fixed relative position.

An aperture is formed in the transverse plate 11, through which the shaft extends. On the shaft support side of the plate 11, the sealing impellers 22 and 23 are secured and on the other side the main pump impeller 21, the plate being recessed to form a circular depression or well 40 to receive the seal impeller 23. Between impellers 22 and 23 is a diaphragm 41 which has an edge flange 42 to form a well 43 receiving the impeller 22. A cover plate 44, centrally apertured to receive the shaft 20 and spacer 33 is placed to overlie the diaphragm 41, contacting around its periphery with the edge flange 42 to form a liquid closure. Bolts 45 connect closure plate 44 and plate 11 serving to force these plates into contact with the flange 42 whereby a liquid sealing enclosure at the periphery of impellers 22 and 23 is obtained. It is pointed out that the outer diameters of spacers 33, 35 and 37 are less, respectively, than the inner diameters of the openings in plate 44, diaphragm 41 and plate 11, whereby a continuous liquid passageway 46 is formed around the two sealing impellers. A primer tube 47 is placed in the cover plate 44, as shown.

In order to secure pressure differentials in the sealing impeller unit both the impellers as well as the adjoining partition walls are grooved. The impeller 22 is formed with radial grooves 48 on one side with the other side smooth, the smooth side 49 being on the main pump side. The diaphragm 41 adjoining the smooth side 49 is desirably formed with uniform arcuate grooves 50 in successive formation around the subimpeller area inside flange 42 and each extending as a circular arc from a point adjacent the impeller edge to a point adjacent the impeller center on the far side of the shaft 20. The arc is convex in the direction of normal impeller rotation so that when the impeller is rotated in a liquid any liquid flow in the direction of rotation tends to be channeled in the diaphragm grooves and move toward the impeller center. Thus, centrifugal action due to impeller rotation is opposed as will be more fully described hereinafter.

Similarly, impeller 23 has radial grooves 51 on one side and a smooth side 52; and recess wall 40 is formed with circular grooves 53 identical in arrangement to the grooves 50 in the diaphragm 41. Since the two seal impellers are connected by the passage 46, it is apparent that a two stage arrangement is secured wherein the pressures of each impeller unit are added together to produce a resulting one-way pressure opposing the leak.

The main pump impeller 21 consists of a hub 54, a disk 55, and vanes 56. The disk 55 is welded to the hub on the seal pump side thereof and consists of a flat circular plate having shallow radial grooves 57 on the seal pump or inner side, the other side being smooth. On the smooth side of the impeller 21, vanes 56 are attached by any appropriate means. These vanes are of substantial width, relative to the disk thickness, and extend from the disk 55 to the outer hub edge; they are shown radial in form, although for some uses they may be curved, parallel to the plane of rotation. The purpose of disk 55 is primarily as a seal to bar admission of air to the main pump. A secondary important function of the disk 55 is to supplement the action of the seal impellers 22 and 23, and the formation of the grooves 57 on the inner side thereof enables it to act as part of the series seal pump chain.

Figure 17:
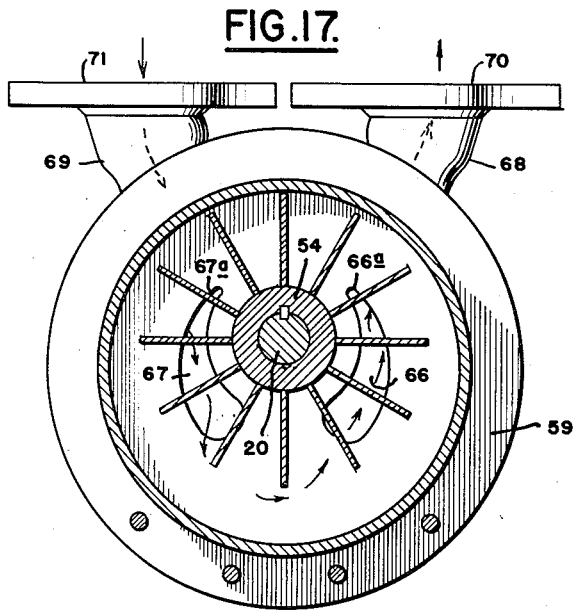
Fig. 17 is a view along line 17—17 of Fig. 2 showing the eccentrically mounted main pump impeller.

The housing of the main pump impeller includes the main plate 11, an outer closed plate 59 and an annular spacing ring 60. Preferably the ring is welded to the plate 11 while the plate 59 is connected removably to the ring by a ridge and groove joint. Bolts 61 assure positive attachment of these elements to obtain a complete enclosure therefor. The center of the ring 60 is eccentric relative to the shaft section 29 so that while at the top of the pump impeller the clearance between rotor and ring is just large enough for operation, at the bottom of the impeller the clearance is substantial, as indicated by space 62. (See also Fig. 17.) The face of plate 11 is preferably cut with an annular groove 63 underlying the impeller to protect the pump-seal from non-uniform pressure distribution in the pump housing. At the ring bottom a drain outlet 64 with pipe connection 65 is provided.

Figure 1:
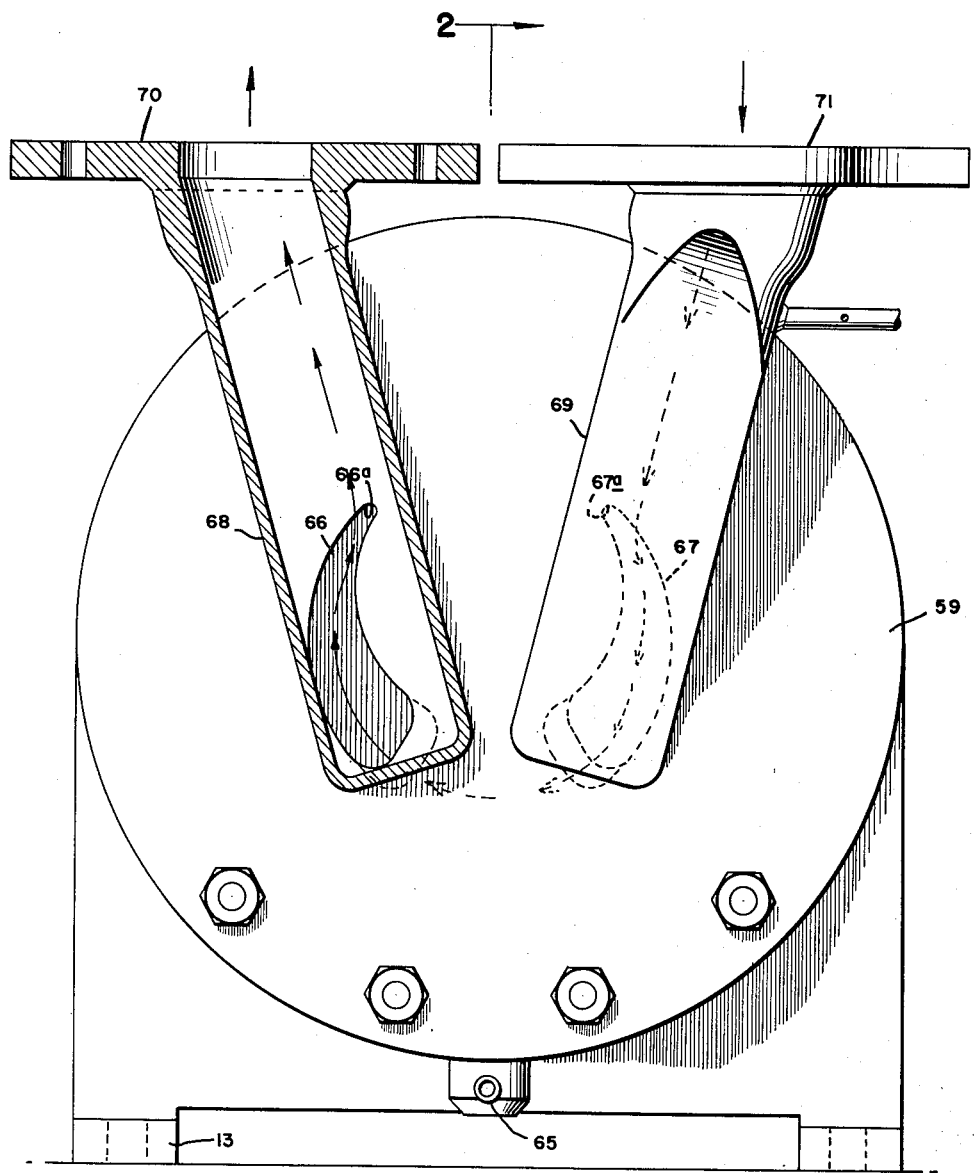
Fig. 1 is a view of the pump, partly in section, showing the vent connectors.

The outer plate 59 of the main pump casing has two vent openings 66 and 67 (Fig. 1) with inlet and outlet connectors 68 and 69 therefor. The vent openings are semicrescentic in shape and genereally vertical, with the points 66a and 67a of the crescents on top and leaning toward the central vertical line of the plate, as shown in Fig. 1. The obtuse ends of the vent openings are beveled in approximate alignment with the vent connectors as indicated by dotted lines in Fig. 1. The vent connectors 68 and 69 are straight tubes joining the plate 59 at an acute angle preferably under 40° and usually under 30°. The purpose of the crescent shape of the vents is to aid in securing gradually increasing pressures at the inlet vent 66 and gradually decreasing pressures at the outlet vent 67. Further, by using the sharp-angled connectors cavitation and shock losses due to vane impact with incoming liquid are markedly reduced at the inlet and increased diffusion results at the outlet. This is due to the fact that the sharp angle permits a tangential impact of the incoming liquid on the vanes of the impeller thus avoiding pronounced angular change in the direction of liquid flow. Appropriate flange connections 70 and 71 are formed at the outer terminals of the vent connectors 68 and 69.

Fig. 9 illustrates a modification of the structure of Fig. 2 in which the arcuate grooves such as are shown at 50 and 53 in Fig. 2 on the diaphragm 41 and plate 11 respectively, are omitted. By so doing the pump is made adaptable for use to produce reverse flow of the pump liquid. This is accomplished by reversing the direction of rotation of the pump shaft, and since the main pump vanes are radial an automatic reversion occurs. Where one-way operation is continuously maintained the modification of Figs. 1 and 2 is preferable.

Figure 10:
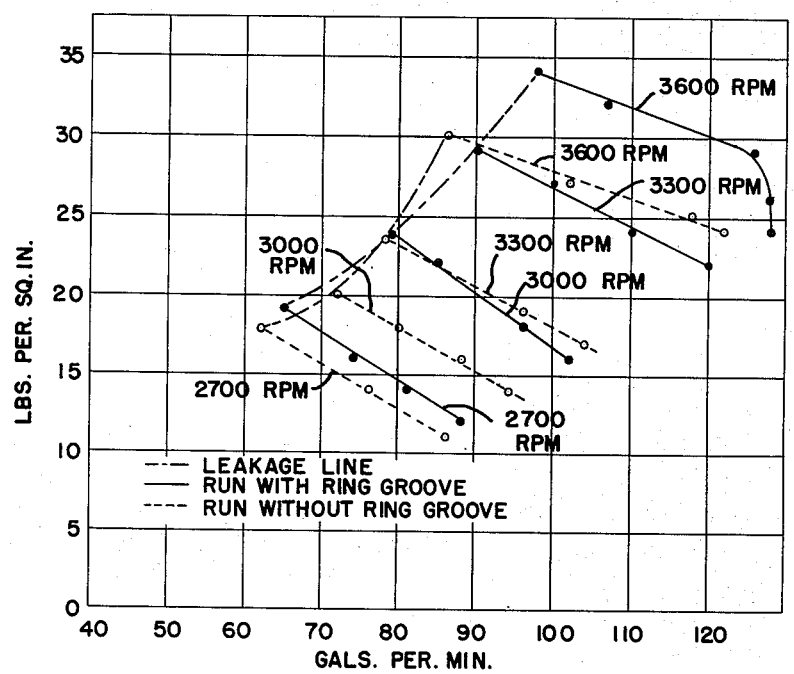
Fig. 10 is a view illustrating pump action with and without a ring groove on the main impeller casing.
Figure 16:
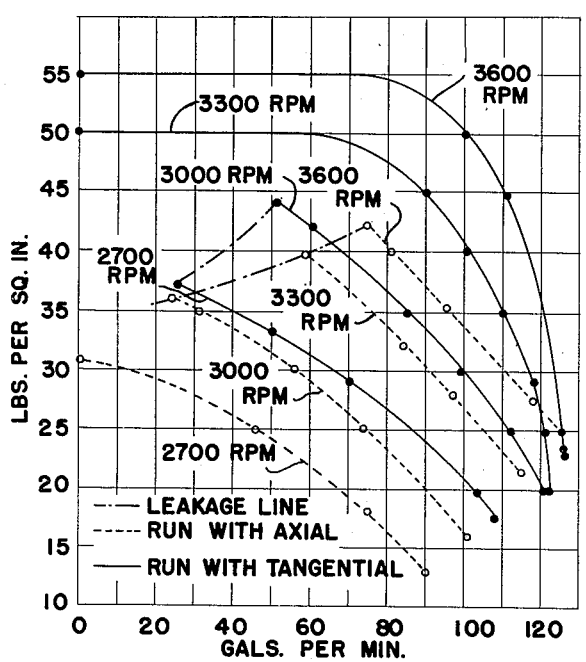
Fig. 16 illustrates variation in the type of vent connectors.

The operation and characteristics of the pump will now be considered with special reference to the curves of Figs. 10 and 16.

In starting the pump, about one half pint of distilled water is fed into primer 47 while the motive power is applied. The water is thus forced through the seal pump to the main pump where by action of the vanes it assumes the form of a rotating ring. The quantity of water is such that the vanes are submerged in varying degree, due to the eccentricity of the impeller, the lowermost vanes being submerged only at the tips and the uppermost vanes being completely submerged. There is thus formed a crescent shaped space 73 beneath the ends of which the outlet 66 and inlet vent 67 appear. With rotation of the impeller in the indicated direction, the space enclosed by any two vanes moving down continuously increases, thus developing suction and drawing fluid through the pump inlet 67. Conversely, the space enclosed by any two vanes moving up continuously decreases thus developing pressure and forcing the fluid through outlet 66. As soon as suction and compression develop in the pump, liquid flows from the storage tank through the pump to the receiving receptacle.

It appears at once that since the pressure developed is a function of pump action, there will be a tendency to leakage, and that since the pump housing is liquid tight except for the channel 46 past the seal pump impellers, there will be a tendency for liquid to flow through this channel during pump operation. This tendency is countered by the pressure developed in the seal pumps with the result that leakage is obviated.

The action of the seal pumps is as follows: When liquid enters the housing of either 22, 23 or 55, the rotation of the impellers tends to impart similar rotation to the liquid. This gives rise to centrifugal forces, carrying the liquid to the impeller periphery. In the case of impeller 22, the centrifugal action is aided by radial grooves 48 on the side of the impeller farther from the main pump. The other side of the impeller being smooth has a much reduced centrifugal effect on the liquid. The net result is a pressure toward the main pump 21. As a further aid in developing pumpward pressure the arcuate grooves 50 in the diaphragm 41 channel such liquid as may have a forward rotational movement due to the smooth side of the impeller and move it away from the impeller periphery. In other words, the curved grooves in the diaphragm restrict rotation of the liquid on the smooth side of the impeller, thus diminishing the centrifugal head. Further as far as there is any rotational velocity created it is used to force the liquid into the arcuate grooves creating a flow along the grooves towards the center. This channeled flow continues to get additional impulses like a turbine pump from the rotating impeller. Hence, the grooved side of the impeller works as a centrifugal pump, while centrifugal pump action is suppressed on the smooth side and a turbine pump effect is used to enforce a flow toward the center along the curved grooves of the diaphragm. Since there is a constant circulation of a fresh supply of cool leakage liquid through the seal no special provision for cooling the liquid in the seal has to be made.

Impeller 22, 23 and main impeller disk 55 work in series, thus having a multi-stage pumping effect. Since in this particular pump leakage pressure as well as sealing pressure are variable with speed of shaft rotation, it is possible to so choose the seal layout that its effectiveness is largely independent of shaft speed for the range of speeds selected.

When it is desired to stop the pump the inlet and outlet conduits are closed by suitable valves and the drain 64—65 opened, the power rotation of the shaft being continued in order to maintain the dynamic seal of disk 55. Distilled water or other cleansing solution is then admitted at the primer duct 47, swirled through the unit and eliminated at the drain until the pump interior is sufficiently cleansed. The motive power and supply of distilled water is then stopped.

Figure 11:
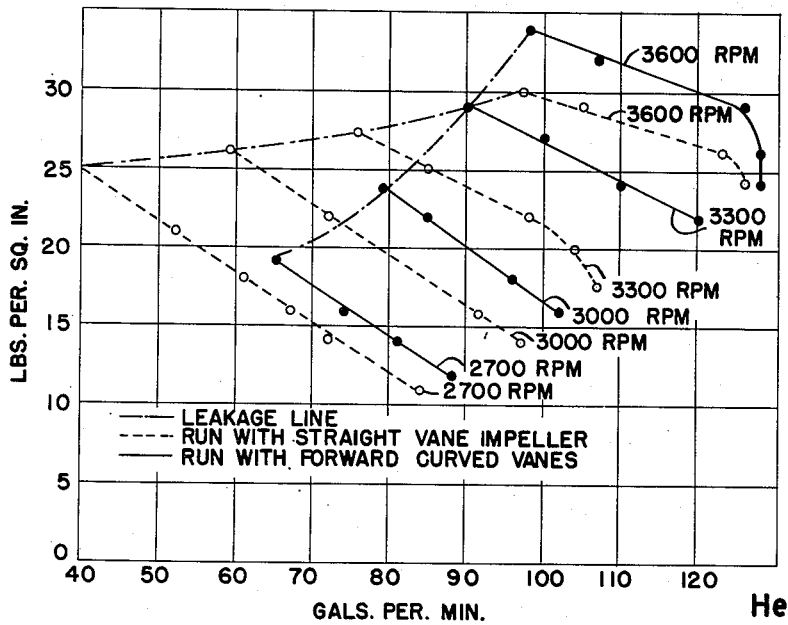
Fig. 11 is a view illustrating effect of curved vanes in the pump impeller.
Figure 12:
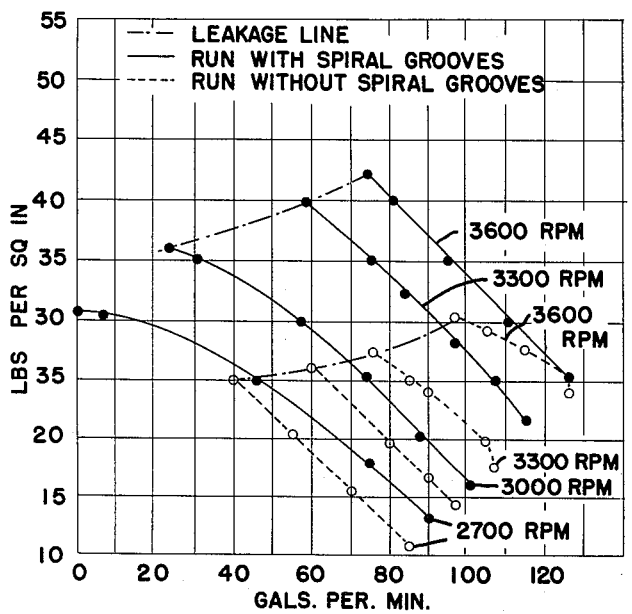
Fig. 12 is a view illustrating effect of spiral grooves in the seal pump diaphragm.

Certain structural elements of the pump are noteworthy in increasing the workability and usefulness of the pump action. Reference is made first to the ring groove 63 in plate 11 underlying the impeller 55. The effect of this groove is to distribute the internal pump pressures thereby reducing the peak pressures acting on the seal and in effect increasing the discharge pressure at which the seal starts to leak. Fig. 10 illustrates the effect of the groove in raising the discharge pressure at which the seal will leak. The maximum discharge pressure at 3600 R. P. M. for example, is lifted from 30 to 34 pounds per square inch. Fig. 11 illustrates the result of curving the main impeller vanes toward the direction of rotation as compared with the straight vanes. The curved vane construction has a better head characteristic. In Fig. 12 the effect of the arcuate grooves in the walls adjoining the smooth sides of the seal impellers is illustrated. A notable increase in maximum discharge or leakage pressure occurs, for example, from 30 to 42 pounds per square inch at 3600 R. P. M.

Figure 13:
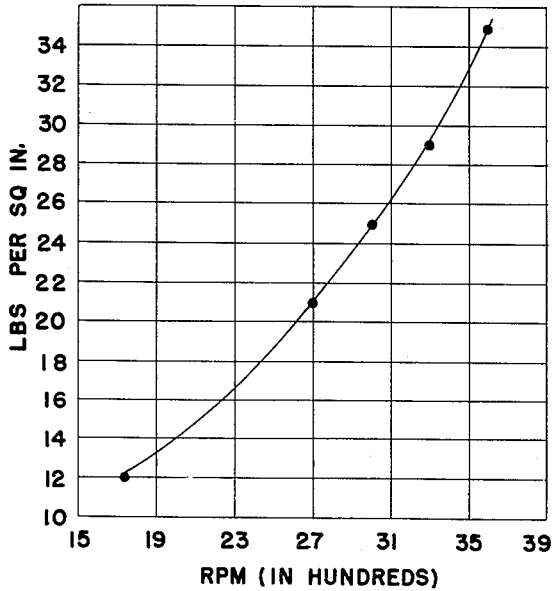
Fig. 13 illustrates the effect of seal impeller speed on maximum sealing pressure.
Figure 14:
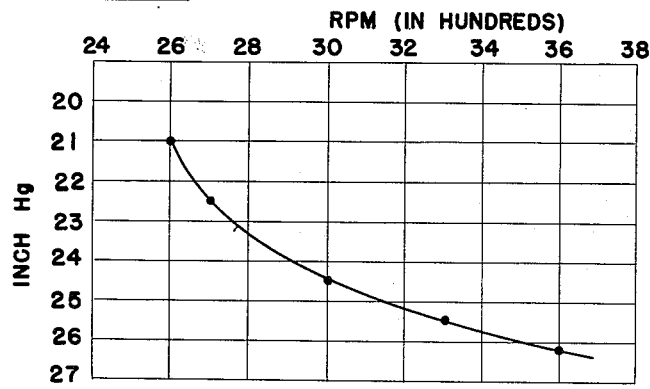
Fig. 14 illustrates the effect of the pump impeller speed on suction lift.

The influence of shaft revolutions per minute on the maximum sealing pressure of the two impeller seals is illustrated in Fig. 13. It is made apparent by the curve of this figure that an increase in shaft speed produces not only an increased pump pressure but also an opposing seal pressure in greater proportion. The effect of pump impeller speed on the suction lift is shown in Fig. 14, from which it is clear that the seal does not interfere with good priming or high suction lift of the pump.

Fig. 16 illustrates the advantage of the sharp angled vent connectors over the perpendicular flow type connectors, with the other improved features being included in the compared construction. It shows decided improvement in the head capacity curves with increase of maximum discharge pressure from about 42.5 to 55.0 pounds per square inch at 3600 revolutions per minute. For pump speeds between 3300 and 3600 revolutions per minute no seal leaks develop. Also there is a considerable decrease in cavitation noises.

Figure 15:
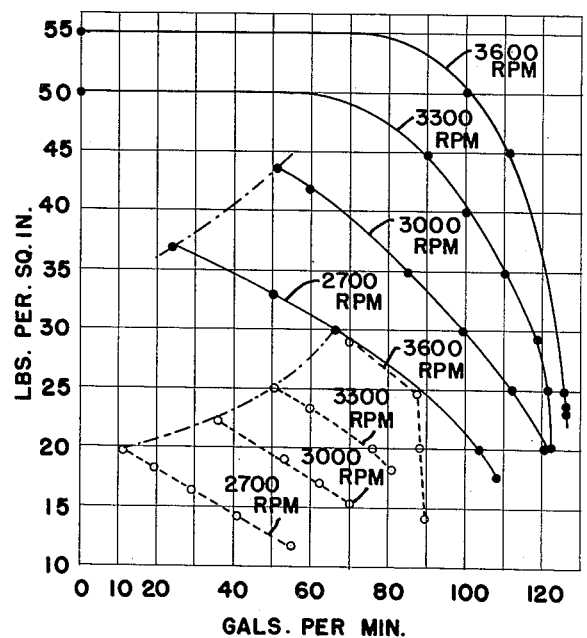
Fig. 15 shows comparative characteristics of two types of pumps.

The combined effect of the features as described is illustrated in Fig. 15, which discloses complete sealing action at speeds of 3300 to 3600 revolutions per minute and an increase in maximum sealing pressure for leakage from about 30 to 55 pounds per square inch. Since there are no physical contacts, no noticeable heat develops at the sealing area and all danger of explosion or burning is removed. The use of the arcuate grooves 50 and 53 results in an increase of 30% in the maximum sealing pressures, but where reversibility in the main pump action is desired these grooves may be omitted. Preferably, the reverse seal pressure should be sufficient to prevent leakage when the main outlet valve to the pump is closed.

It is pointed out that the seal action of the pump is not secured by a liquid ring or centrifugal manometer effect as might be inferred from the use of rotating impellers but through development of a differential centrifugal pressure at opposite peripheral edges of the impeller, resulting in a kinetic force impulse as distinguished from the static condition known in prior art devices. Freedom from mechanical friction pressures makes high speed pumps feasible for use with inflammable or explosive liquids. It is emphasized that the seal is not restricted to pumps, but is applicable to any rotating unit wherein a seal between a rotating element, such as a shaft, and a stator element is required. Such a seal may be placed at both ends of a rotatable shaft, for example.

Obviously many modifications and variations of the present invention are possible in the light of the above teachings. It is therefore to be understood that within the scope of the appended claims, the invention may be practiced otherwise than as specifically described.

The invention described herein may be manufactured and used by or for the Government of the United States of America for governmental purposes without the payment of any royalties thereon or therefor.

It is claimed:

1. A liquid ring type liquid pump comprising a drumlike casing having opposed flat end walls, inlet and outlet vents formed in one of said walls, a circular groove on the inside surface of the other of said walls, a shaft extending centrally through said other wall centrally of said circular groove, a rotor mounted on said shaft having outwardly extending vanes, said groove underlying a relatively small portion only of said rotor, a sealing disk mounted on said shaft adjoining said rotor and having a plurality of spiral grooves facing away from said rotor, a sealing pump mounted on said shaft adjoining said sealing disk and having a sealing impeller mounted on said shaft adjacent said sealing disk, said sealing impeller having radially extending grooves on the side away from said sealing disk and a smooth face on the side facing said sealing disk.

2. A liquid pump, comprising a main casing having inlet and outlet vents, a shaft eccentrically mounted within said main casing, a rotor forming an impeller having outwardly extending vanes mounted in said casing on said shaft, an annular groove formed in said casing opposite said vents and underlying a relatively small portion only of said rotor, and liquid sealing means mounted on said shaft adjacent said impeller adapted to move liquid in a direction toward said impeller only, said sealing means comprising a series of centrifugal seal pumps arranged side by side on the impeller shaft, each seal pump comprising a disk rotor fixed to the shaft and an auxiliary casing enclosing said disk rotor, said auxiliary casing having outwardly extending arcuate grooves on the disk rotor side thereof, each disk rotor having the impeller side smooth and the other side radially grooved, whereby series pressure on liquid leakage in the seal pumps toward the impeller is secured.

3. A liquid pump, comprising a main casing having inlet and outlet vents, a shaft eccentrically mounted within said main casing, a rotor forming an impeller having outwardly extending vanes mounted in said casing on said shaft, an annular groove formed in said casing opposite said vents and underlying a relatively small portion only of said rotor, and liquid sealing means mounted on said shaft adjacent said impeller adapted to move liquid in a direction toward said impeller only, said sealing means comprising a series of centrifugal seal pumps arranged side by side on the impeller shaft, at least one seal pump comprising a disk rotor fixed to the shaft and an auxiliary casing enclosing said disk rotor, said disk rotor having the impeller side smooth and the other side radially grooved, said auxiliary casing having curved grooves on the disk rotor side for centripetally returning liquid toward said impeller, and another of said seal pumps being attached on said shaft and to said impeller.

4. On a self-sealing and priming pump, a drum-like casing having opposed walls, two fracto-crescent shaped allochiral openings formed in one wall of said casing, the inner arc of each of said openings having a common center eccentric to the casing center, a shaft mounted on said casing at said point of eccentricity with sections extending into and out of said casing, an impeller having outwardly extending blades attached thereto mounted in said casing on said shaft, the orbit of the rotor blades overlying the casing wall openings, a primer receptacle, pump means having coacting centrifugal force producing means and centripetal force producing means positioned between said receptacle and impeller for forcing priming liquid into said casing, whereby on rotation of said impeller a priming liquid seal is formed enclosing said casing openings and means for evenly distributing non-uniform discharge pressures about said liquid seal.

5. A liquid ring type fluid pump comprising a main drum like casing having inlet and outlet vents in one wall thereof, an auxiliary drum like casing having one wall in common with said main casing, a shaft eccentrically mounted within said main casing and concentrically within said auxiliary casing, a rotor mounted on said shaft within said main casing, said rotor having impeller vanes on a side facing said vents and radial grooves formed therein on a side opposite said vents, an annular groove in said common wall on the side facing said vents and opposite a relatively small portion only of said rotor, said annular groove adapted to uniformly distribute discharge pressures in said main casing adjacent said common wall, and a seal pump mounted on said shaft within said auxiliary casing having coacting centrifugal and centripetal force producing means adapted to counteract the force of discharge pressures and thereby prevent leakage.

6. A liquid ring type fluid reversible pump comprising a drum like casing having inlet and outlet vents in one face thereof, a shaft eccentrically mounted with said casing, a rotor having vanes mounted on a side facing said vents and radial grooves on the other side, a circular groove formed on the inside of the other face of said casing and underlying an annular relatively small portion only of said rotor, means driving said rotor for forming a liquid pump seal, said groove adapted to protect said pump seal from non-uniform pressure distributions in said casing, and a seal pump mounted on said shaft adapted to move leakage fluid toward said rotor.

7. A liquid ring type liquid pump comprising a drum like casing, said casing having inlet and outlet vents in one face thereof, a sealing disc forming the other face, a relatively small circular groove eccentrically formed on the inside of said sealing disc, and a plurality of spiral grooves on the outside thereof, a shaft extending through said disc centrally of said circular groove, a rotor mounted on said shaft having impellers facing said vents and radial grooves formed therein on the side facing said disc, said circular groove underlying only an annular portion of said rotor, and a sealing impeller mounted on said shaft adjacent the outside of said disc having radially extending grooves on a side away from said disc and a smooth face on the side facing said spiral grooves.

References Cited in the file of this patent

UNITED STATES PATENTS

| 832,651 | Bettis | Oct. 9, 1906 |
| 1,281,972 | Johnston | Oct. 15, 1918 |
| 1,949,428 | McGee | Mar. 6, 1934 |
| 2,127,865 | Goddard | Aug. 23, 1938 |

FOREIGN PATENTS

| 333,113 | Germany | Feb. 17, 1921 |
| 421,964 | Great Britain | Jan. 2, 1935 |
| 453,901 | Italy | Sept. 22, 1938 |
| 652,168 | Germany | Oct. 26, 1937 |